(12) United States Patent
Kikuchi

(10) Patent No.: US 9,870,616 B2
(45) Date of Patent: Jan. 16, 2018

(54) INFORMATION PROCESSING DEVICE, INFORMATION PROCESSING METHOD, AND SYSTEM

(71) Applicant: Naoki Kikuchi, Kanagawa (JP)

(72) Inventor: Naoki Kikuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/075,543

(22) Filed: Mar. 21, 2016

(65) Prior Publication Data

US 2016/0284088 A1 Sep. 29, 2016

(30) Foreign Application Priority Data

Mar. 23, 2015 (JP) .................. 2015-059836

(51) Int. Cl.
| | | |
|---|---|---|
| *H04N 17/00* | (2006.01) | |
| *H04N 17/02* | (2006.01) | |
| *G06T 7/00* | (2017.01) | |
| *G06K 9/46* | (2006.01) | |
| *H04N 5/232* | (2006.01) | |
| *H04N 13/02* | (2006.01) | |
| *G06T 7/80* | (2017.01) | |
| *G06K 9/62* | (2006.01) | |

(52) U.S. Cl.
CPC .......... *G06T 7/0018* (2013.01); *G06K 9/4604* (2013.01); *G06K 9/6201* (2013.01); *G06T 7/85* (2017.01); *H04N 5/23222* (2013.01); *H04N 5/23293* (2013.01); *H04N 13/0239* (2013.01); *H04N 13/0246* (2013.01); *H04N 17/002* (2013.01); *G06T 2207/20092* (2013.01); *G06T 2207/30208* (2013.01)

(58) Field of Classification Search
CPC .......... H04N 5/23222; H04N 5/23293; H04N 13/0246; H04N 17/002; G06T 7/0018; G06T 7/80; G06T 7/85; G06T 2207/20092; G06T 2207/30208; G06K 9/32; G06K 9/4604
USPC ......................... 348/187, 188, 180
See application file for complete search history.

(56) References Cited

U.S. PATENT DOCUMENTS

| | | | |
|---|---|---|---|
| 6,437,823 B1 | 8/2002 | Zhang | |
| 8,416,262 B2 * | 4/2013 | Saunders | ................. G09G 5/00 345/589 |

(Continued)

FOREIGN PATENT DOCUMENTS

| | | |
|---|---|---|
| EP | 2 993 894 A1 | 3/2016 |
| JP | 2012-198031 | 10/2012 |

(Continued)

OTHER PUBLICATIONS

Extended European Search Report dated Sep. 5, 2016 in Patent Application No. 16161712.1.

(Continued)

*Primary Examiner* — Trang U Tran
(74) *Attorney, Agent, or Firm* — Oblon, McClelland, Maier & Neustadt, L.L.P.

(57) ABSTRACT

An information processing device includes an obtainer and a controller. The obtainer obtains a captured image obtained through imaging by an imaging device. The controller generates instruction information for instructing how a subject having plural feature points is to be held up.

18 Claims, 7 Drawing Sheets

(56) References Cited

U.S. PATENT DOCUMENTS

| | | |
|---|---|---|
| 2007/0216953 A1 | 9/2007 | Kikuchi et al. |
| 2008/0068412 A1 | 3/2008 | Kikuchi et al. |
| 2008/0253608 A1 | 10/2008 | Long et al. |
| 2009/0167804 A1 | 7/2009 | Kikuchi et al. |
| 2009/0283598 A1* | 11/2009 | Sherman .............. G06K 9/3216 235/404 |
| 2010/0002039 A1 | 1/2010 | Kikuchi et al. |
| 2012/0142436 A1 | 6/2012 | Sato |
| 2014/0263649 A1* | 9/2014 | Antognini ......... G06F 17/30277 235/454 |
| 2014/0285676 A1 | 9/2014 | Barreto et al. |
| 2015/0278572 A1 | 10/2015 | Asukai et al. |
| 2016/0073021 A1 | 3/2016 | Chang et al. |

FOREIGN PATENT DOCUMENTS

| | | |
|---|---|---|
| JP | 2014-529389 | 11/2014 |
| WO | WO 2008/112216 A1 | 9/2008 |
| WO | WO 2014/091659 A1 | 6/2014 |

OTHER PUBLICATIONS

Andrew Richardson, et al., "AprilCal: Assisted and repeatable camera calibration," 2013 IEEE/RSJ International Conference on Intelligent Robots and Systems (IROS), XP032537280, Nov. 3-7, 2013, pp. 1814-1821.

* cited by examiner

AFTER DIVISION (EXAMPLE: SIX 300 × 300 pix AREAS)

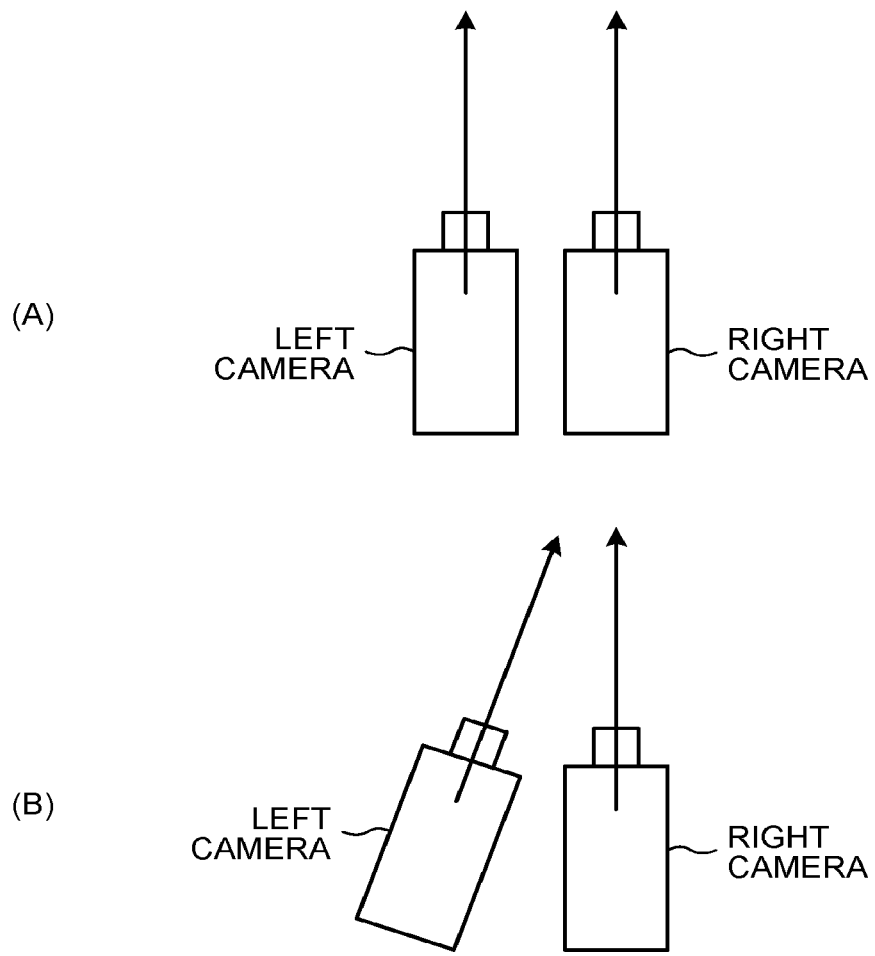

INFORMATION PROCESSING DEVICE, INFORMATION PROCESSING METHOD, AND SYSTEM

CROSS-REFERENCE TO RELATED APPLICATIONS

The present application claims priority to and incorporates by reference the entire contents of Japanese Patent Application No. 2015-059836 filed in Japan on Mar. 23, 2015.

BACKGROUND OF THE INVENTION

1. Field of the Invention

The present invention relates to an information processing device, an information processing method, and a system.

2. Description of the Related Art

A calibration technique has been known, in which: imaging is performed with an imaging device, such as, for example, a camera, while position and posture of a subject having plural feature points are changed; and a correction parameter for correcting a captured image is found based on plural images (captured images) obtained by the imaging.

For example, in U.S. Pat. No. 6,437,823, a technique is disclosed, in which: a state where a user holds up a chart having plural feature points to a camera is imaged; and a correction parameter is found based on plural images obtained by the imaging.

However, in this conventional technique, since position and posture of the chart with respect to the camera are completely entrusted to the user, an area where the chart is not caught at all in an image area of a captured image may be generated, and no feature points are able to be extracted from that area. In that case, information needed in calculation of the correction parameter is unable to be obtained sufficiently, and thus a problem of reduction in calculation accuracy for the correction parameter occurs. Further, in order to solve this problem, for example, preparing a chart that is sufficiently large with respect to an angle of view of the camera may be considered. However, since it is difficult to secure planarity of such a large chart, due to a warp in the chart itself; the problem of reduction in calculation accuracy of the correction parameter is caused.

SUMMARY OF THE INVENTION

It is an object of the present invention to at least partially solve the problems in the conventional technology.

An information processing device includes an obtainer and a controller. The obtainer obtains a captured image obtained through imaging by an imaging device. The controller generates instruction information for instructing how a subject having plural feature points is to be held up.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram illustrating an example of a stereo camera.

DETAILED DESCRIPTION OF THE PREFERRED EMBODIMENTS

Hereinafter, with reference to the appended drawings, an embodiment of an information processing device, an information processing method, and a system according to the present invention will be described in detail.

Figure 1:
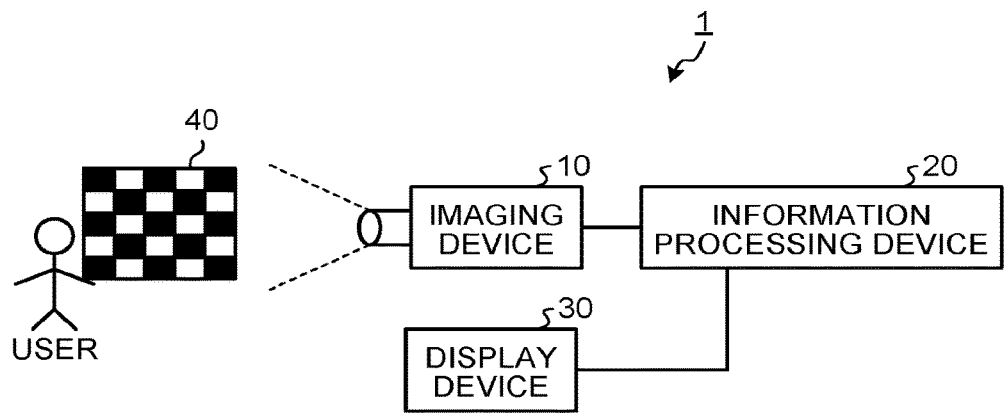
FIG. 1 is a diagram illustrating an example of a configuration of a system according to an embodiment.

FIG. 1 is a diagram illustrating an example of a configuration of a system 1 of this embodiment. As illustrated in FIG. 1, the system 1 of this embodiment includes an imaging device 10, an information processing device 20, and a display device 30.

The imaging device 10 is a device that carries out imaging, and is formed of, for example, a camera. In this specification, "imaging" means converting an image to be captured, which has been imaged by an optical system, such as a lens, into electric signals. When a calibration mode, where calibration is executed, is started, the imaging device 10 carries out imaging at a predetermined cycle (carries out imaging serially), according to instructions of the information processing device 20.

When an operation for instructing the calibration mode to be started is received from a user, the information processing device 20 instructs the imaging device 10 to start imaging, and every time imaging is carried out by the imaging device 10, the information processing device 20 obtains a captured image acquired by that imaging. The information processing device 20 carries out control of displaying, on the display device 30, a superimposed image, which includes the captured image, and instruction information superimposed on the captured image, the instruction information for instructing how a chart 40 having plural feature points (an example of a subject having plural feature points) is to be held up. A specific configuration of the information processing device 20 will be described later. The display device 30 is a device that displays thereon various types of information (including the superimposed image, and the like), and is formed of, for example, a liquid crystal type display device.

In this embodiment, a user who holds up the chart 40 to the imaging device 10 moves the chart while looking at the superimposed image displayed on the display device 30. In the example of FIG. 1, the chart 40 is a plate like member having a pattern indicating a check, the pattern formed on a surface thereof, but this chart 40 is an example of a subject having plural feature points, and is not limited to this example. "Check" refers to a pattern where two types of rectangles (squares or rectangles) with different colors are alternately arranged. In the example of FIG. 1, the pattern of the chart 40 is a pattern, where white rectangles and black rectangles are alternately arranged. In this case, since a change in brightness of the image is large at a position where a white boundary and a black boundary intersect with each other, this position is able to be considered as a feature point.

Figure 2:
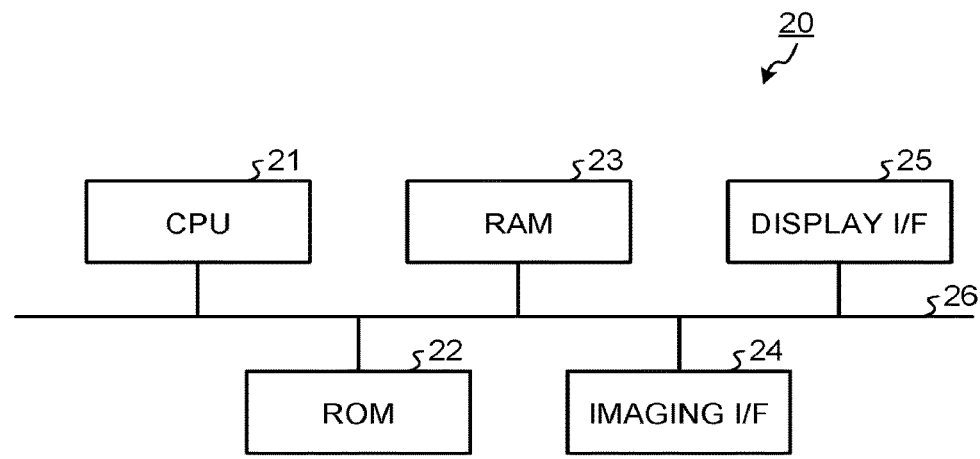
FIG. 2 is a diagram illustrating an example of a hardware configuration of an information processing device.

Next, the specific configuration of the information processing device 20 of this embodiment will be described. FIG. 2 is a diagram illustrating an example of a hardware configuration of the information processing device 20 of this embodiment. As illustrated in FIG. 2, the information processing device 20 includes a CPU 21, a ROM 22, a RAM 23, an imaging I/F 24, and a display I/F 25, and these are connected to one another via a bus 26.

The CPU 21 comprehensively controls operation of the information processing device 20. The ROM 22 is a non-volatile memory that stores therein various data, such as a program. The RAM 23 is a volatile memory, which functions as a work area for various types of arithmetic processing executed by the CPU 21. The imaging I/F 24 is an interface for connecting to the imaging device 10. The display I/F 25 is an interface for connecting to the display device 30.

Figure 3:
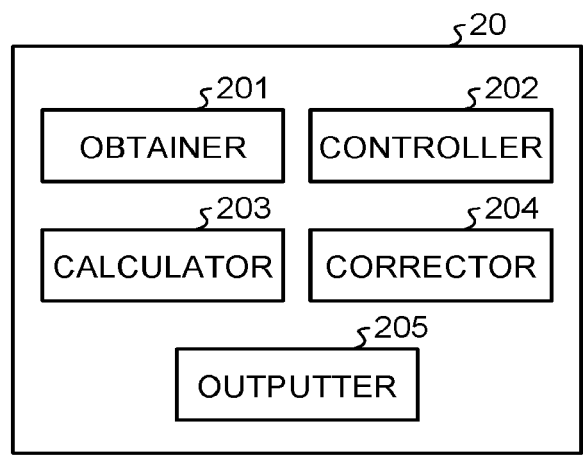
FIG. 3 is a diagram illustrating an example of functions that the information processing device has.

FIG. 3 is a diagram illustrating an example of functions that the information processing device 20 of this embodiment has. As illustrated in FIG. 3, the information processing device 20 has an obtainer 201, a controller 202, a calculator 203, a corrector 204, and an outputter 205. For convenience of explanation, in FIG. 3, examples of functions related to this embodiment are mainly illustrated, but the functions that the information processing device 20 has are not limited to these examples.

The obtainer 201 obtains a captured image acquired through imaging by the imaging device 10. In this example, the information processing device 20 instructs the imaging device 10 to start imaging, when the information processing device 20 receives an operation instructing the calibration mode to be started from a user. Every time imaging is carried out by the imaging device 10, the obtainer 201 obtains a captured image acquired by the imaging.

The controller 202 carries out control of displaying, on the display device 30, the superimposed image, which includes the captured image and the instruction information superimposed on the captured image, the instruction information for instructing how the chart 40 having the plural feature points is to be held up. The instruction information according to this embodiment is information for instructing a position and a posture of the chart 40 with respect to the imaging device 10. More specifically, the instruction information is information indicating a shape of the chart 40 that is supposed to be caught in the captured image when a position and a posture of the chart 40 match the position and the posture corresponding to the instruction information. In general, even if a square object is captured by a camera, due to a positional relation between the camera and the object, distortion of the camera itself, and the like, the object caught in the captured image does not become square.

The controller 202 sequentially generates two or more corresponding pieces of instruction information for each of plural areas dividing an image area of a captured image, and every time these pieces of instruction information are generated, the controller 202 changes the superimposed image to be displayed on the display device 30 by carrying out control of displaying, on the display device 30, a superimposed image, which includes the captured image and the generated pieces of instruction information superimposed on the captured image. In this embodiment, for each of the plural areas, the controller 202 sequentially generates two or more pieces of instruction information having a one-to-one correspondence with two or more positions and postures of the chart 40 determined in advance correspondingly to that area.

Further, if a relation between instruction information and the chart 40 caught in a captured image satisfies a predetermined condition, the controller 202 obtains (generates) that captured image and feature point data including positions of plural feature points caught in that captured image, and generates the next instruction information. As described already, instruction information according to this embodiment is information indicating a shape of the chart 40 that is supposed to be caught in a captured image when a position and a posture of the chart 40 held up by a user match a position and a posture corresponding to the instruction information. The controller 202 determines that the predetermined condition is satisfied, if the number of feature points extracted from the captured image is equal to or greater than a first threshold, and a difference between a shape indicated by the instruction information and the shape of the chart 40 caught in the captured image is less than a second threshold. Further, the controller 202 may determine whether or not the predetermined condition is satisfied, based on whether or not the amount of exposure is appropriate. On the contrary, if the relation between the instruction information and the chart 40 caught in the captured image does not satisfy the predetermined condition, the controller 202 carries out notification to prompt the position and posture of the chart 40 to be changed. More specific contents will be described later.

According to this embodiment, when two or more sets of feature point data having a one-to-one correspondence with two or more pieces of instruction information corresponding to any one of plural areas dividing an image area of a captured image are obtained, the controller 202 sequentially generates two or more pieces of instruction information corresponding to another area.

Figure 4:
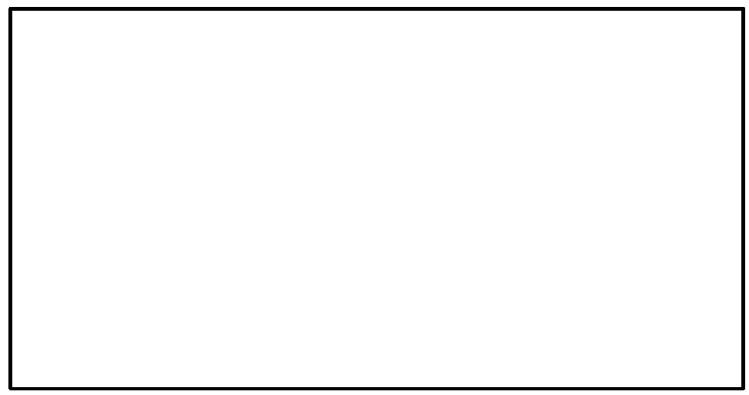
FIG. 4 is a diagram illustrating an example of an image area of a captured image.
Figure 5:
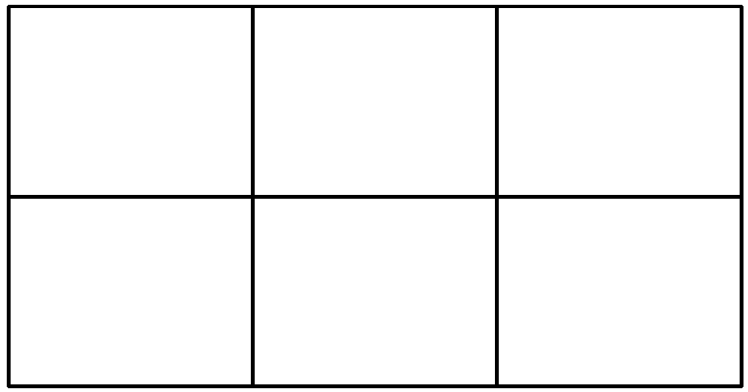
FIG. 5 is a diagram illustrating an example of plural areas dividing the image area.

For example, as illustrated in FIG. 4, a case will be supposed, where the size of the image area of a captured image is 900 pixels×600 pixels (one pixel indicating a size of one picture element). In this example, it is supposed that an area, where the chart 40 is caught in the image area, is an area of 300 pixels×300 pixels corresponding to about 20 percent of the whole image area, and as illustrated in FIG. 5, it is supposed that two or more sets of feature point data are obtained for each of six areas obtained as a result of dividing the image area into six (division into two vertically, and division into three horizontally). The division number is not limited to six, and may be modified variously according to design conditions and the like.

For each of the six areas, the controller 202 sequentially generates two or more corresponding pieces of instruction information, and obtains two or more sets of feature point data having a one-to-one correspondence with these two or more pieces of instruction information. For example, it is supposed that the top left area of the six areas illustrated in FIG. 5 is treated as an area of interest, and feature point data corresponding to this area of interest are obtained. The controller 202 sequentially generates two or more pieces of instruction information having a one-to-one correspondence with two or more positions and postures of the chart 40 determined in advance correspondingly to that area of interest, and carries out control of displaying, on the display device 30, a superimposed image, which includes the captured image and the generated instruction information superimposed on the captured image. In this example, as the two or more positions and postures of the chart 40 corresponding to the top left area, plural patterns are prepared in advance, the plural patterns respectively prespecifying translation components, shift X/shift Y/shift Z, and three rotation components, Yaw/Pitch/Roll, of three dimensional positions of the chart 40 with respect to the imaging device 10. In this example, with the optical center of the imaging device (camera) being the origin, a coordinate system will be considered, where a direction of distance to the subject (depth direction) is Z-axis direction, a horizontal direction is X-axis direction, and an up-down direction (vertical direction) is Y-axis direction, and an amount of shift in X-axis direction of three dimensional positions (X, Y, Z) of this coordinate system will be denoted as shift X, an amount of shift in Y-axis direction as shift Y, and an amount of shift in Z-axis direction as shift Z, respectively. Further, a rotation angle about Y-axis of the three dimensional positions (X, Y, Z) will be denoted as Yaw, a rotation angle about X-axis as Pitch, and a rotation angle about Z-axis as Roll.

Figure 6:
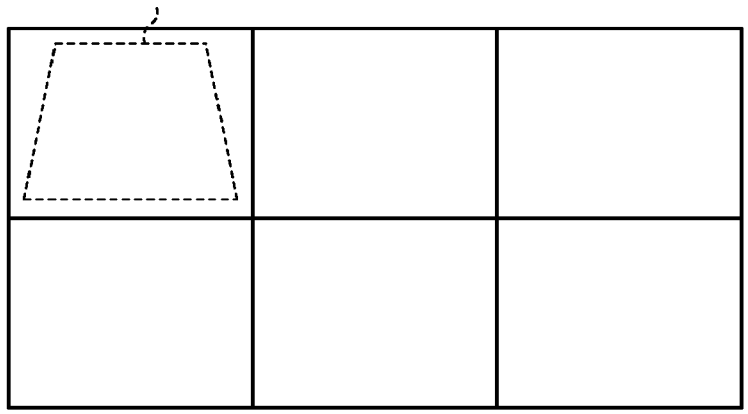
FIG. 6 is a diagram illustrating an example of instruction information.
Figure 7:
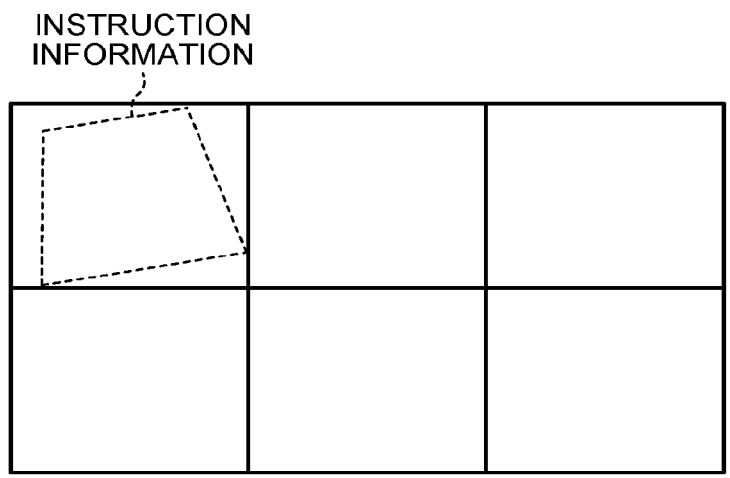
FIG. 7 is a diagram illustrating an example of the instruction information.

The controller 202 sequentially generates plural pieces of instruction information having a one-to-one correspondence with the above described plural patterns, and carries out control of displaying, on the display device 30, a superimposed image, which includes the captured image and the generated instruction information superimposed on the captured image. FIG. 6 is a diagram illustrating an example of instruction information corresponding to one pattern of the above described plural patterns. The instruction information in FIG. 6 is information indicating a shape of the chart 40 that is supposed to be caught in a captured image when a position and a posture of the chart 40 held up by a user match a position and a posture indicated by that one pattern. FIG. 7 is a diagram illustrating an example of instruction information corresponding to another pattern. The instruction information in FIG. 7 is information indicating a shape of the chart 40 that is supposed to be caught in a captured image when a position and a posture of the chart 40 held up by a user match a position and a posture indicated by that other pattern.

By presentation of the above described instruction information to the user, the user is able to intuitively adjust the position and posture of the chart 40, without being aware of specific numerical values related to the position and posture.

In this example, as the two or more positions and postures of the chart 40 corresponding to the top left area, five patterns (referred to as a first pattern, a second pattern, a third pattern, a fourth pattern, and a fifth pattern) are prepared in advance.

For example, the first pattern is a combination of shift X=−200 mm, shift Y=−150 mm, shift Z=1000 mm, Yaw=0 deg, Pitch=0 deg, and Roll=0 deg. Instruction information corresponding to the first patterns is information indicating a shape of the chart 40 that is supposed to be caught in the captured image when the position and posture of the chart 40 match the position and posture indicated by the first pattern.

Further, the second pattern is a combination of shift X=−220 mm, shift Y=−170 mm, shift Z=1050 mm, Yaw=5 deg, Pitch=−5 deg, and Roll=0 deg. Instruction information corresponding to the second patterns is information indicating a shape of the chart 40 that is supposed to be caught in the captured image when the position and posture of the chart 40 match the position and posture indicated by the second pattern.

Furthermore, the third pattern is a combination of shift X=−230 mm, shift Y=−160 mm, shift Z=1020 mm, Yaw=15 deg, Pitch=0 deg, and Roll=10 deg. Instruction information corresponding to the third pattern is information indicating a shape of the chart 40 that is supposed to be caught in the captured image when the position and posture of the chart 40 match the position and posture indicated by the third pattern.

Moreover, the fourth pattern is a combination of shift X=−240 mm, shift Y=−190 mm, shift Z=990 mm, Yaw=−15 deg, Pitch=−5 deg, and Roll=−10 deg. Instruction information corresponding to the fourth pattern is information indicating a shape of the chart 40 that is supposed to be caught in the captured image when the position and posture of the chart 40 match the position and posture indicated by the fourth pattern.

In addition, the fifth pattern is a combination of shift X=−250 mm, shift Y=−200 mm, shift Z=980 mm, Yaw=−5 deg, Pitch=−15 deg, and Roll=5 deg. Instruction information corresponding to the fifth pattern is information indicating a shape of the chart 40 that is supposed to be caught in the captured image when the position and posture of the chart 40 match the position and posture indicated by the fifth pattern.

When a relation between the generated instruction information (instruction information included in the superimposed image), and the chart 40 caught in the captured image satisfies the predetermined condition, the controller 202 obtains that captured image, and feature point data including positions of plural feature points caught in that captured image, and generates the next instruction information (instruction information corresponding to another pattern, in this example). As described above, the controller 202 determines that the predetermined condition is satisfied, when the number of feature points extracted from the captured image is equal to or greater than the first threshold, and the difference between the shape indicated by the instruction information and the shape of the chart 40 caught in the captured image is less than the second threshold.

For example, if a distance between one corner of four corners of the shape indicated by the instruction information and a corresponding corner in the chart 40 caught in the captured image is less than a reference value, the difference between the shape indicated by the instruction information and the shape of the chart 40 caught in the captured image may be determined to be less than the second threshold. Further, for example, for each of the four corners of the shape indicated by the instruction information, when a distance between that corner and a corresponding corner in the chart 40 caught in the captured image is less than a reference value, the difference between the shape indicated by the instruction information and the shape of the chart 40 caught in the captured image may be determined to be less than the second threshold. Not being limited thereto, any of various methods may be adopted as a method of determining whether or not the difference between the shape indicated by the instruction information and the shape of the chart 40 caught in the captured image is less than the second threshold.

Figure 8:
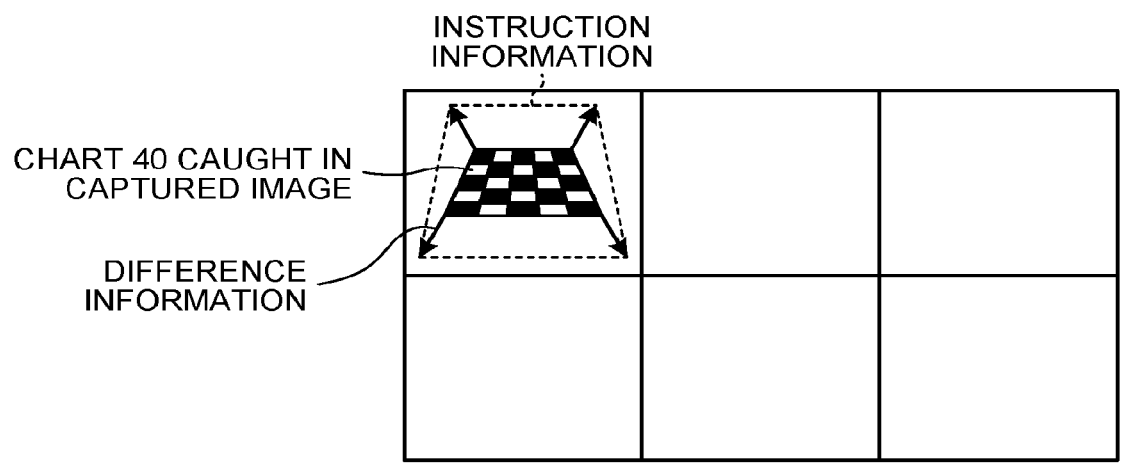
FIG. 8 is a diagram illustrating an example of difference information.

Furthermore, as described already, the controller 202 carries out the notification to prompt the position and posture of the chart 40 to be changed if the relation between the generated instruction information and the chart 40 caught in the captured image does not satisfy the predetermined condition. For example, the controller 202 may output a sound notifying of a method of changing the position and posture of the chart 40 (a changing method needed to make the position and posture of the chart closer to the position and posture corresponding to the instruction information), or may carry out control of displaying, on the display device 30, text indicating that changing method. Moreover, for example, as illustrated in FIG. 8, the controller 202 may display (display on the superimposed image), on the display device 30, difference information indicating how different the generated instruction information is from the chart 40 caught in the captured image (indicated with arrows in the example of FIG. 8).

The controller 202 may cancel the obtainment of feature point data corresponding to the current instruction information if a state where the predetermined condition is not satisfied continues for a certain time period.

As described above, the controller 202 obtains corresponding feature point data for each of the plural pieces of instruction information having a one-to-one correspondence with the above described plural patterns. When plural sets of feature point data having a one-to-one correspondence with plural pieces of instruction information have been obtained, the obtainment of feature point data corresponding to the top left area is ended. Next, the controller 202 obtains feature point data corresponding to another area (an area from which feature point data have not been obtained yet) in the same way, by treating that area as an area of interest. This processing is repeated until obtainment of feature point data corresponding to each of the six areas is completed.

For example, processing may be repeated until obtainment of feature point data corresponding to each of the six areas is completed, the processing being: changing the area of interest every time obtainment of feature data corresponding to one piece of instruction information corresponding to the area of interest is completed; and obtaining feature point data corresponding to one piece of instruction information corresponding to the changed area of interest. For example, the processing may be repeated until obtainment of feature point data for each of the six areas is completed, the processing being: when feature point data corresponding to one piece of instruction information corresponding to the top left area (instruction information corresponding to any one pattern of the plural patterns prepared in advance correspondingly to the top left area) are obtained, treating an area on the right and adjacent thereto (a top center area illustrated in FIG. 5, in this example) as an area of interest; and obtaining feature point data corresponding to one piece of instruction information corresponding to the top center area (instruction information corresponding to any one pattern of the plural patterns prepared in advance correspondingly to the top center area).

In short, the controller 202 may sequentially generate two or more corresponding pieces of instruction information for each of plural areas dividing an image area of a captured image, and change a superimposed image displayed on the display device 30 by carrying out control of displaying, on the display device 30, a superimposed image, which includes the captured image and the generated instruction information superimposed on the captured image, every time the instruction information is generated.

Figure 9:
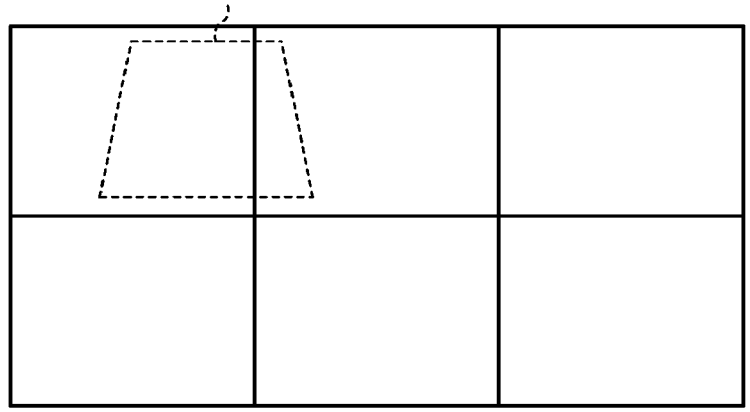
FIG. 9 is a diagram illustrating an example of the instruction information.

In addition, for example, for each of plural areas, the controller 202 may sequentially generate two or more pieces of instruction information corresponding to that area, such that a shape of the chart 40 indicated by at least one of the two or more pieces of instruction information corresponding to the area extends over that area and another area adjacent to the area. For example, a shape indicated by instruction information corresponding to at least one pattern of the plural patterns prepared in advance correspondingly to the top left area illustrated in FIG. 5 may indicate a shape extending over the top left area and the top center area adjacent to the top left area, as illustrated in FIG. 9. Thereby, feature point data corresponding to a portion extending over areas are able to be obtained without omission, and thus reduction in calculation accuracy for a correction parameter is able to be suppressed further.

Figure 10:
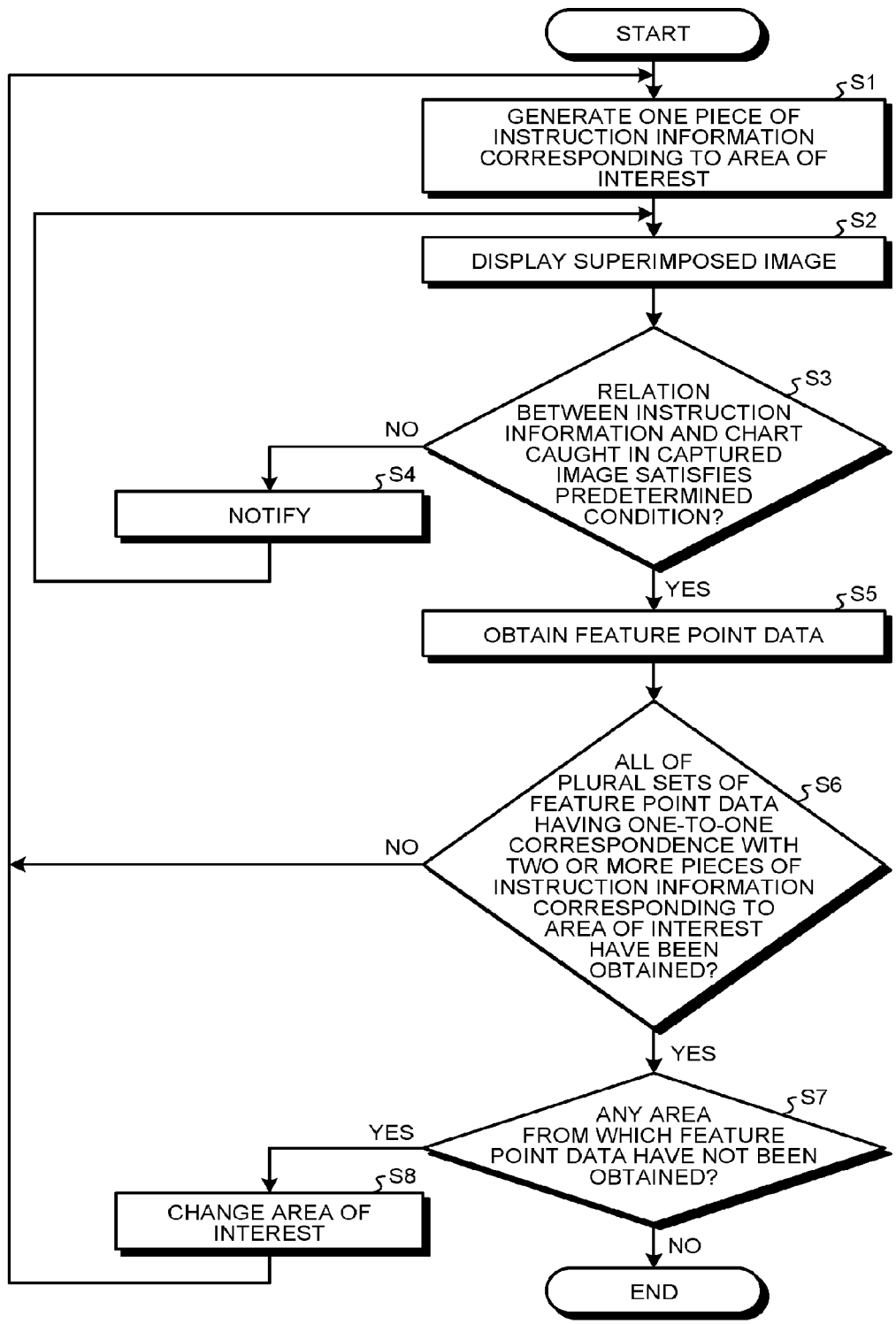
FIG. 10 is a flow chart illustrating an example of operation of a controller.

FIG. 10 is a flow chart illustrating an example of operation of the controller 202. In this example, the controller 202 focuses on one of six areas dividing an image area of a captured image, and carries out processing of obtaining feature point data corresponding to the focused area. In the following description, the focused area may be referred to as "area of interest".

As illustrated in FIG. 10, the controller 202 generates one piece of instruction information corresponding to an area of interest (Step S1). In this example, any one pattern of the plural patterns prepared in advance correspondingly to the area of interest is selected, and instruction information corresponding to the selected pattern is generated. Next, the controller 202 carries out control of displaying, on the display device 30, a superimposed image, which includes the captured image and the instruction information generated in Step S1, the instruction information having been superimposed on the captured image (Step S2). Every time the obtainer 201 obtains a captured image, the controller 202 generates the superimposed image, which includes the obtained captured image and the instruction information generated in Step S1, the instruction information having been superimposed on the obtained captured image, and carries out the control of displaying, on the display device 30, the generated superimposed image.

Next, the controller 202 determines whether or not a relation between the instruction information generated in Step S1 (instruction information included in the superimposed image) and the chart 40 caught in the captured image satisfies the predetermined condition (Step S3). If a result of Step S3 is negative (Step S3: No), the controller 202 carries out notification to prompt the position and posture of the chart 40 to be changed (Step S4) and repeats the processing from Step S2. If a result of Step S3 is positive (Step S3: Yes), the controller 202 obtains (generates) feature point data including that captured image, and positions (coordinate values) of plural feature points caught in that captured image (Step S5). Whether or not all of two or more sets of feature point data having a one-to-one correspondence with the two or more pieces of instruction information corresponding to the area of interest (from another perspective, plural sets of feature point data having a one-to-one correspondence with the plural patterns prepared in advance correspondingly with the area of interest) have been obtained is determined (Step S6).

If a result of Step S6 is negative (Step S6: No), the processing is returned to Step S1. At Step S1, the controller 202 selects one pattern that has not been selected yet from the plural patterns prepared in advance correspondingly to the area of interest, and generates instruction information corresponding to that selected pattern. The processing from Step S2 is then repeated. If a result of Step S6 is positive (Step S6: Yes), the controller 202 determines whether or not any area, from which feature point data have not been obtained, is left in the plural areas (Step S7).

If a result of Step S7 is positive (Step S7: Yes), the controller 202 changes the area of interest (Step S8). More specifically, the controller 202 treats the area, from which feature point data have not been obtained yet, of the plural areas, as an area of interest, and repeats the processing from Step S1. If a result of Step S7 is negative (Step S7: No), the processing is ended.

For example, the controller 202 may display information indicating progress of obtainment of feature point data, on the display device 30. For example, information indicating the number of patterns, for which obtainment of feature point data has been completed (or the number of patterns, for which obtainment of feature point data has not been carried out yet), of all of the patterns (all of the patterns prepared in advance correspondingly to the respective plural areas), may be displayed. Further, for example, when feature point data corresponding to one area are being obtained, information may be displayed, the information indicating the number of patterns, for which obtainment of feature point data has been completed (or the number of patterns, for which obtainment of feature point data has not been carried out yet), of the plural patterns prepared in advance correspondingly to that one area; or for example, color of instruction information may be changed according to progress of the obtainment of feature point data (for example, the color being made closer to red as the obtainment progresses towards completion).

Description will be made returning to FIG. 3 again. The calculator 203 calculates a correction parameter for correcting a captured image, based on plural sets of feature point data. In this embodiment, the calculator 203 calculates the correction parameter, based on the plural sets of feature point data having a one-to-one correspondence with all of instruction information, when, for each of the plural areas, two or more sets of feature point data having a one-to-one correspondence with two or more pieces of instruction information corresponding to that area have been obtained. In this example, from a captured image included in feature point data, a target coordinate value (ideal position) is calculated for each of plural feature points, and a pair (data set) of the target coordinate value and a coordinate value of a feature point on the captured image (included in the feature point data) is found for each set of feature point data, plurally. A coefficient of a correction equation expressing a relation between a coordinate value of a captured image and a target coordinate value is found by a least-squares method, and the found coefficient is able to be regarded as the correction parameter. Any of various known techniques may be used as a method of calculating this correction parameter. For example, a technique described in U.S. Pat. No. 6,437,823 may be used as the method of calculating the correction parameter.

Further, not being limited thereto, for example, the calculator 203 may calculate the correction parameter, every time two or more sets of feature point data having a one-to-one correspondence with two or more pieces of instruction information corresponding to any area of the plural areas are obtained, based on the obtained two or more sets of feature point data. When the calculation of the correction parameter by the calculator 203 is completed, the calibration mode is ended, and the processing is advanced to a normal operation mode (normal mode).

By using the correction parameter calculated by the calculator 203, the corrector 204 corrects a captured image obtained by the obtainer 201 in the normal mode. The outputter 205 outputs the captured image corrected by the corrector 204. A mode of the output is arbitrary, and for example, the outputter 205 may carry out control of displaying, on the display device 30, the captured image corrected by the corrector 204.

In this embodiment, functions of respective units (the obtainer 201, the controller 202, the calculator 203, the corrector 204, and the outputter 205) of the above described information processing device 20 are implemented by the CPU 21 executing a program stored in a storage device, such as the ROM 22. Not being limited thereto, for example, at least a part of the functions of the respective units of the information processing device 20 described above may be implemented by a dedicated hardware circuit (for example, a semiconductor integrated circuit, or the like).

As described above, in this embodiment, since control of displaying a superimposed image on the display device 30 is carried out, the superimposed image including a captured image and instruction information superimposed on the captured image, and the instruction information for instructing how the chart 40 having plural feature points is to be held up; how to move the chart 40 is able to be guided so that a position and a posture of the chart 40 held up by a user match each of plural positions and postures (desired plural positions and postures) needed in calibration. Thereby, reduction in calculation accuracy for a correction parameter for correcting a captured image is able to be suppressed. Further, a large chart does not need to be prepared.

Although the embodiment according to the present invention has been described above, the present invention is not limited to the above described embodiment as is, and may be embodied by modifying its components upon implementation, without departing from the gist thereof. Further, by combining plural components disclosed in the above described embodiment as appropriate, various inventions may be formed. For example, some components from all of the components described in the embodiment may be omitted.

For example, the calibration method of the above described embodiment may be applied to calibration of a stereo camera. The stereo camera has two cameras (a right camera and a left camera) arranged, with a predetermined distance (base line length) provided in a horizontal direction. As illustrated at (A) in FIG. 11, a mode, where the cameras are arranged such that their optical axis directions are parallel to each other, is sometimes referred to as "rectified stereo camera". Furthermore, as illustrated at (B) in FIG. 11, the cameras may be arranged such that their optical axis directions are not parallel to each other. In any of these modes, the above described calibration method of the embodiment is applicable to calibration of each of the right camera and left camera.

(Program)

The program executed by the CPU 21 of the above described information processing device 20: may be configured to be provided by being recorded on a computer readable recording medium, such as a CD-ROM, a flexible disk (FD), a CD-R, a digital versatile disk (DVD), or a universal serial bus (USB), in a file of an installable format or an executable format; or may be configured to be provided or distributed via a network, such as the Internet. Further, various programs may be configured to be provided by being embedded in a ROM or the like in advance.

According to the present invention, reduction in calculation accuracy for a correction parameter for correcting a captured image is able to be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
processing circuitry that
obtains a captured image obtained through imaging a subject by an imaging device,
generates instruction information for instructing how the subject is to be held up,
wherein the instruction information is information indicating a shape of the subject that is supposed to be caught in the captured image when a position and a posture of the subject match the position and the posture corresponding to the instruction information, and the processing circuitry generates the two or more pieces of corresponding instruction information having a one-to-one correspondence with two or more positions and postures of the subject, the two or more positions and postures being determined in advance correspondingly to an area, wherein the two or more pieces of instruction information indicate mutually different shapes.

2. The information processing device according to claim 1, wherein the instruction information is information for instructing a position and a posture of the subject with respect to the imaging device.

3. The information processing device according to claim 1, wherein the processing circuitry sequentially generates two or more corresponding pieces of instruction information, for each of plural areas that divide an image area of the captured image.

4. The information processing device according to claim 3, wherein when the relation between the instruction information and the subject caught in the captured image satisfies the predetermined condition, the processing circuitry obtains feature point data in the captured image and positions of the feature points caught in the captured image, and generates next instruction information.

5. The information processing device according to claim 4, wherein
the instruction information is information indicating a shape of the subject that is supposed to be caught in the captured image when the position and the posture of the subject match the position and the posture corresponding to the instruction information, and
the processing circuitry determines that the predetermined condition is satisfied, when the number of feature points extracted from the captured image is equal to or greater than a first threshold, and a difference between a shape indicated by the instruction information and a shape of the subject caught in the captured image is less than a second threshold.

6. The information processing device according to claim 4, wherein the processing circuitry performs notification to prompt the position and posture of the subject to be changed when the relation between the instruction information and the subject caught in the captured image does not satisfy the predetermined condition.

7. The information processing device according to claim 4, wherein the processing circuitry sequentially generates the two or more pieces of instruction information corresponding to another area when two or more sets of feature point data having a one-to-one correspondence with the two or more pieces of instruction information corresponding to any one area of the plural areas have been obtained.

8. The information processing device according to claim 4, wherein the processing circuitry calculates, based on plural sets of feature point data, a correction parameter for correcting the captured image.

9. The information processing device according to claim 8, wherein the processing circuitry calculates the correction parameter based on the plural sets of feature point data having a one-to-one correspondence with all of the instruction information, when, for each area of the plural areas, the two or more sets of feature point data having a one-to-one correspondence with the two or more pieces of instruction information corresponding to the area have been obtained.

10. The information processing device according to claim 8, wherein every time the two or more sets of feature point data having a one-to-one correspondence with the two or more pieces of instruction information corresponding to any one area of the plural areas are obtained, the processing circuitry calculates the correction parameter based on the obtained two or more sets of feature point data.

11. The information processing device according to claim 3, wherein
the instruction information is information indicating a shape of the subject that is supposed to be caught in the captured image when the position and the posture of the subject match the position and the posture corresponding to the instruction information, and
the processing circuitry sequentially generates, for each area of the plural areas, the two or more pieces of instruction information corresponding to the area, such that a shape of the subject indicated by at least one of the two or more pieces of instruction information corresponding to that area extends over that area and another area adjacent to that area.

12. The information processing device according to claim 1, wherein the processing circuitry performs control of displaying, on a display, a superimposed image including the captured image and the instruction information superimposed on the captured image.

13. The information processing device according to claim 12, wherein every time the instruction information is generated, the processing circuitry changes the superimposed image to be displayed on the display by performing control of displaying, on the display, the superimposed image including the captured image and the generated instruction information superimposed on the captured image.

14. The information processing device according to claim 1, wherein
the instruction information is information for instructing a position and a posture of the subject with respect to the imaging device, and
the processing circuitry sequentially generates two or more corresponding pieces of instruction information, for each of plural areas that divide an image area of the captured image.

15. The information processing device according to claim 1, wherein
the instruction information is information for instructing a position and a posture of the subject with respect to the imaging device,
the instruction information is information indicating a shape of the subject that is supposed to be caught in the captured image when a position and a posture of the subject match the position and the posture corresponding to the instruction information, and
the processing circuitry sequentially generates two or more corresponding pieces of instruction information, for each of plural areas that divide an image area of the captured image.

16. An information processing method, comprising:
obtaining a captured image obtained through imaging a subject by an imaging device;
displaying, on a display, a superimposed image including the captured image and instruction information superimposed on the captured image, the instruction information for instructing how the subject is to be held up, wherein the instruction information is information indicating a shape of the subject that is supposed to be caught in the captured image when a position and a posture of the subject match the position and the posture corresponding to the instruction information, and generating the two or more pieces of corresponding instruction information having a one-to-one correspondence with two or more positions and postures of the subject, the two or more positions and postures being determined in advance correspondingly to an area, wherein the two or more pieces of instruction information indicate mutually different shapes.

17. A system including an imaging device, an information processing device, and a display, the system comprising: processing circuitry that
  displays, on the display, a superimposed image including a captured image obtained through imaging a subject by the imaging device, and instruction information superimposed on the captured image, the instruction information being for instructing how the subject is to be held up,
  wherein the instruction information is information indicating a shape of the subject that is supposed to be caught in the captured image when a position and a posture of the subject match the position and the posture corresponding to the instruction information, and
  the processing circuitry generates the two or more pieces of corresponding instruction information having a one-to-one correspondence with two or more positions and postures of the subject, the two or more positions and postures being determined in advance correspondingly to an area, wherein the two or more pieces of instruction information indicate mutually different shapes.

18. The information processing device of claim 1, wherein the processing circuitry further
  displays a superimposed image including the captured image and the instruction information,
  determines whether a relation between the instruction information and the subject caught in the captured image satisfies a predetermined condition, by determining at least whether a number of feature points extracted from the captured image is equal to or greater than a first threshold, and
  notifies a user to change how the subject is held up when determining that the predetermined condition is not satisfied.

* * * * *